(12) United States Patent
Endo et al.

(10) Patent No.: US 11,801,713 B2
(45) Date of Patent: Oct. 31, 2023

(54) APPARATUS EQUIPPED WITH MOVING TOOL

(71) Applicant: FUJIFILM Business Innovation Corp., Tokyo (JP)

(72) Inventors: Taisuke Endo, Kanagawa (JP); Keigo Shinoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/539,203

(22) Filed: Dec. 1, 2021

(65) Prior Publication Data
US 2023/0056845 A1 Feb. 23, 2023

(30) Foreign Application Priority Data
Aug. 23, 2021 (JP) ................. 2021-135257

(51) Int. Cl.
*B60B 33/00* (2006.01)
*B60B 33/04* (2006.01)

(52) U.S. Cl.
CPC ...... *B60B 33/045* (2013.01); *B60B 2900/212* (2013.01); *B60B 2900/313* (2013.01); *B60B 2900/551* (2013.01)

(58) Field of Classification Search
CPC ... Y10T 16/218; Y10T 16/216; B60B 33/045; B60B 33/0042; B60B 33/0015; B60B 33/0023; B60B 2900/551; B60B 2900/212; B60B 2900/313; B62B 5/02; B62B 5/021; B62B 5/026; B62B 5/023
See application file for complete search history.

(56) References Cited

U.S. PATENT DOCUMENTS

| | | | | |
|---|---|---|---|---|
| 4,000,912 A | * | 1/1977 | Donald | B60B 33/045 267/71 |
| 4,467,496 A | * | 8/1984 | Gregg | B60B 33/045 16/18 B |
| 4,534,433 A | * | 8/1985 | Burbank | B60B 33/045 180/21 |
| 6,089,666 A | * | 7/2000 | Rosko | A47C 7/006 297/463.2 |
| 7,264,272 B2 | * | 9/2007 | Mulhern | A61G 5/043 280/755 |
| 8,607,414 B1 | * | 12/2013 | Kinsela | B60B 33/045 16/35 D |
| 8,650,710 B1 | * | 2/2014 | Waggener | B60B 33/02 16/35 R |

(Continued)

FOREIGN PATENT DOCUMENTS

| | | | |
|---|---|---|---|
| JP | 10057419 A | * | 3/1998 |
| JP | 2009154634 A | * | 7/2009 |
| JP | 2012-038826 | | 2/2012 |

*Primary Examiner* — Chuck Y Mah
(74) *Attorney, Agent, or Firm* — JCIPRNET (57) ABSTRACT

An apparatus equipped with a moving tool includes a base and the moving tool including a wheel that rolls on a floor surface during movement of the apparatus, and a support unit that is fixed to the base at a position above an upper end of the wheel and that supports the wheel. The base includes a contact portion that is disposed at a position behind the support unit in a moving direction and above the upper end of the wheel, and with which the moving tool comes into contact when the support unit is bent rearward.

20 Claims, 6 Drawing Sheets

(56) References Cited

U.S. PATENT DOCUMENTS

| | | | | |
|---|---|---|---|---|
| 2002/0069479 | A1* | 6/2002 | Kuo | B60B 33/045 |
| | | | | 16/45 |
| 2002/0166201 | A1* | 11/2002 | Plate | B60B 33/045 |
| | | | | 16/18 R |
| 2011/0247173 | A1* | 10/2011 | Nguyen | B60B 33/0042 |
| | | | | 16/45 |
| 2015/0174957 | A1* | 6/2015 | Brazier | B60B 33/0068 |
| | | | | 16/45 |

* cited by examiner

APPARATUS EQUIPPED WITH MOVING TOOL

CROSS-REFERENCE TO RELATED APPLICATIONS

This application is based on and claims priority under 35 USC 119 from Japanese Patent Application No. 2021-135257 filed Aug. 23, 2021.

BACKGROUND

(i) Technical Field

The present disclosure relates to an apparatus equipped with a moving tool.

(ii) Related Art

A heavy stationary apparatus may be provided with a moving tool, such as a caster, when it is expected that the apparatus may need to be moved for installation or, for example, once every several years after the installation.

When the apparatus is being moved by using the moving tool provided on the apparatus, the moving tool may hit a step on the floor surface. When this causes severe damage to, for example, a support shaft of the moving tool, further movement may become difficult. An apparatus, such as a cart, that is provided with a moving tool and that carries an object to be carried placed thereon also has a risk that the moving tool will hit a step on a floor surface.

The above-described risk may be reduced by using a stronger moving tool. However, in such a case, the cost will be increased. It is disadvantageous to employ a measure that involves an increase in cost for the apparatus that is moved only on very few occasions.

Japanese Unexamined Patent Application Publication No. 2012-38826 proposes a structure including a component other than a moving tool that comes into contact with a step so that the step does not come into direct contact with a caster.

SUMMARY

Aspects of non-limiting embodiments of the present disclosure relate to an apparatus equipped with a moving tool including a structure for reducing damage to the moving tool even when the moving tool has a strength such that the moving tool may be damaged when hit against a step with a force of a standard upper limit.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an apparatus equipped with a moving tool, the apparatus including a base and the moving tool including a wheel that rolls on a floor surface during movement of the apparatus and a support unit that is fixed to the base at a position above an upper end of the wheel and that supports the wheel, wherein the base includes a contact portion that is disposed at a position behind the support unit in a moving direction and above the upper end of the wheel, and with which the moving tool comes into contact when the support unit is bent rearward.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will now be described.

Figure 1A:
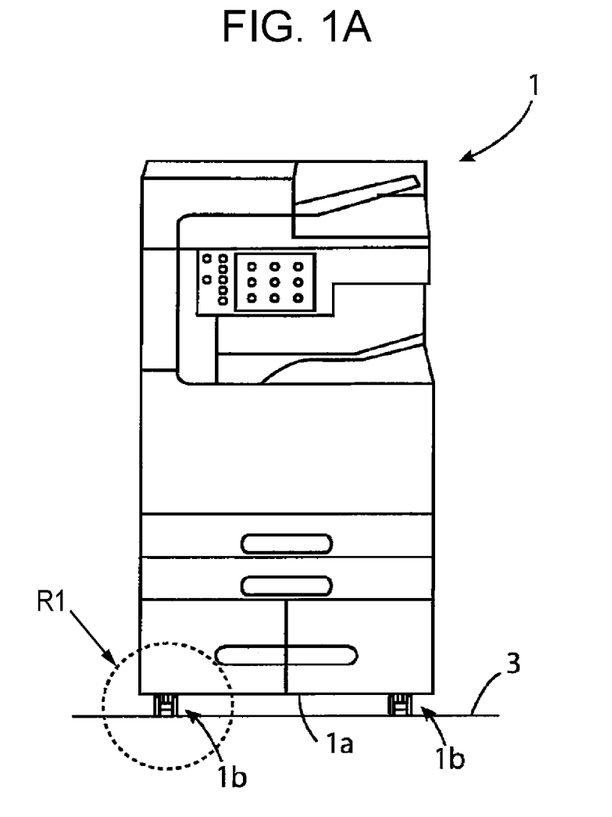
FIGS. 1A and 1B illustrate examples of an apparatus equipped with a moving tool according to a first exemplary embodiment of the present disclosure.
Figure 1B:
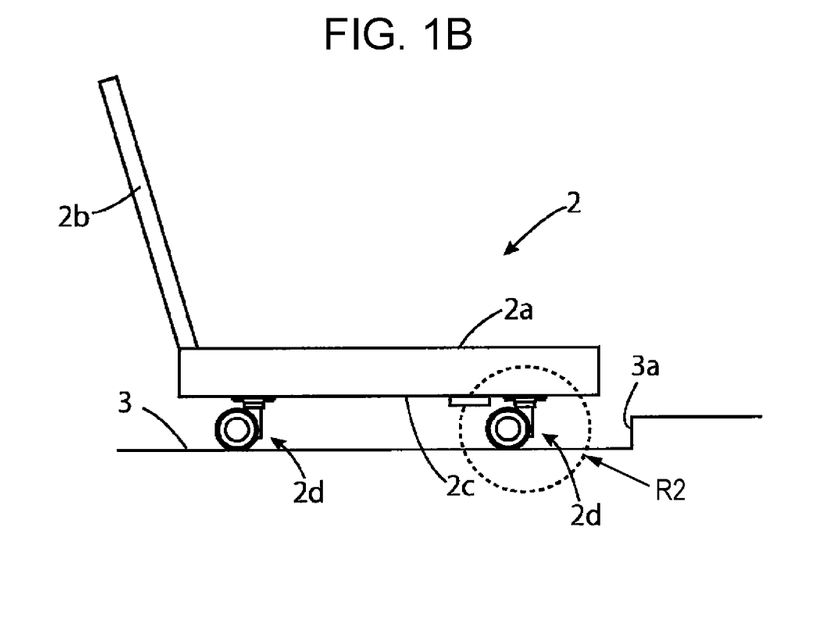

FIGS. 1A and 1B illustrate examples of an apparatus equipped with a moving tool according to a first exemplary embodiment of the present disclosure.

The example illustrated in FIG. 1A is a so-called multifunction machine having plural functions, such as printing and scanning functions. Although a multifunction machine 1 will be described herein, the following description is not limited to the multifunction machine 1, and applies generally to apparatuses provided with casters. Such an apparatus may be a machine, an instrument, a piece of furniture, or a box, and examples thereof include machines such as multifunction machines, carts, casters, and desks.

The multifunction machine 1 is too heavy for a person to lift and carry, and casters 1b for movement thereof are provided on a bottom surface 1a at positions near four corners of the bottom surface 1a. The casters 1b are capable of changing orientations thereof in accordance with the moving direction so that the multifunction machine 1 is movable in any direction. The structure for changing the orientation will be described below with reference to FIG. 2.

The multifunction machine 1 is configured to be capable of being lifted and carried by a forklift or a pallet truck (not illustrated), and the space between the bottom surface 1a and a floor surface 3 is high enough to receive forks of the forklift or the pallet truck.

In the case of the multifunction machine 1, a housing or a frame that defines the bottom surface 1a corresponds to an example of a base according to the present disclosure. In addition, each caster 1b corresponds to an example of a moving tool according to the present disclosure.

FIG. 1B illustrates an example of a cart and an example of a floor surface.

A cart 2 is an apparatus used to carry an object to be carried by placing the object on a cart body 2a and pushing a handle 2b. Casters 2d are provided on a bottom surface 2c of the cart body 2a at positions near four corners of the bottom surface 2c. In the case of the cart 2, two casters 2d that are far from the handle 2b, that is, disposed at the front in the moving direction, are capable of changing orientations thereof, and two casters 2d that are adjacent to the handle 2b, that is, located at the rear in the moving direction, have fixed orientations. In the case of the cart 2, the cart body 2a corresponds to an example of a base according to the present disclosure. In addition, also in the case of the cart 2, each caster 2d corresponds to an example of the moving tool according to the present disclosure.

The bottom surface 2c of the cart 2 needs to be at a sufficient height so that even when the floor surface 3 has a step 3a, the step 3a of the floor surface 3 does not come into contact with the bottom surface 2c of the cart 2. Even when the height of the step 3a is such that the step 3a does not come into contact with the bottom surface 2c of the cart 2, the casters 2d have a risk of hitting the step 3a during movement of the cart 2. When this occurs, the casters 2d receive a lateral force, and may be deformed and damaged.

The above-described situation is not limited to the cart 2, and applies also to the multifunction machine 1 illustrated in FIG. 1A. Although the multifunction machine 1 and the cart 2 are described, the description herein is not limited to the multifunction machine 1 and the cart 2, and applies generally to apparatuses provided with casters.

Figure 2:
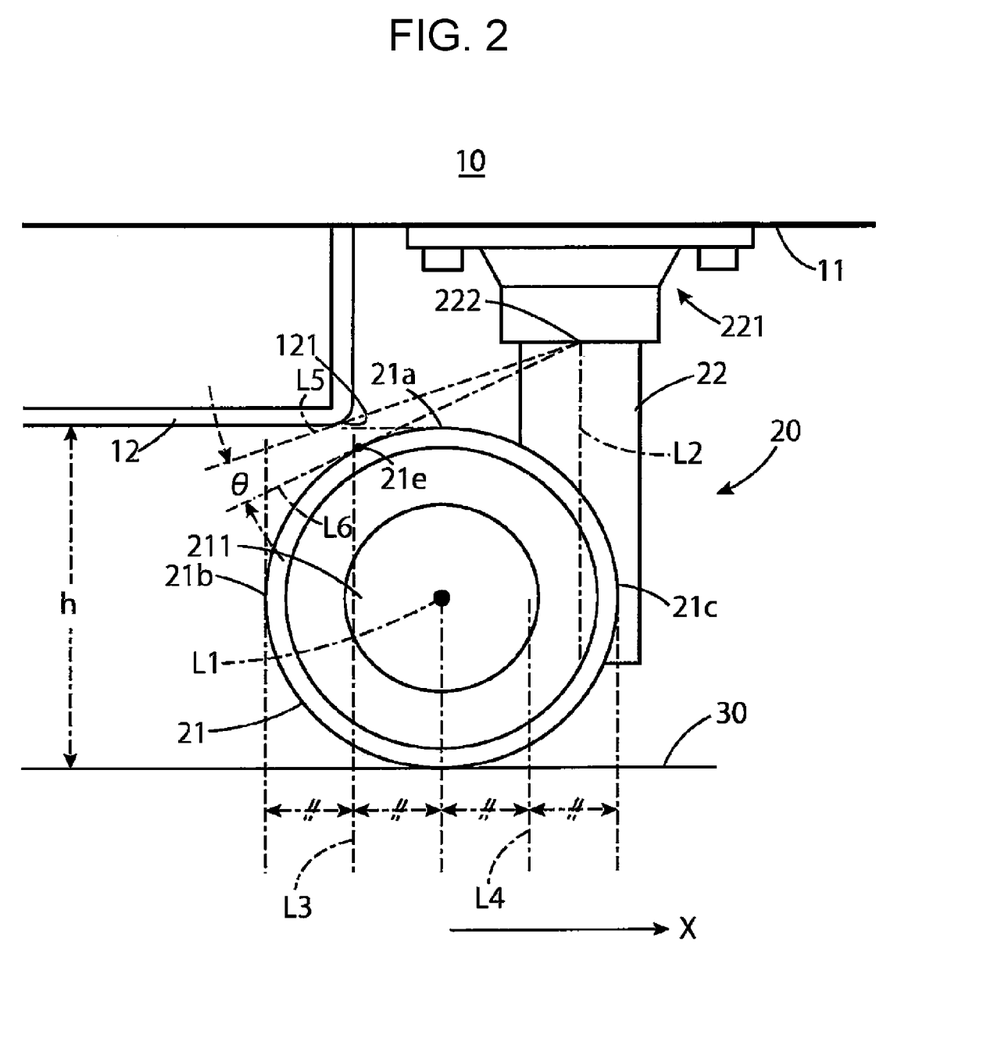
FIG. 2 is an enlarged view of the part shown by circle R1 in FIG. 1A and the part shown by circle R2 in FIG. 1B.

FIG. 2 is an enlarged view of the part shown by circle R1 in FIG. 1A and the part shown by circle R2 in FIG. 1B. Although the caster 1b shown by circle R1 and the caster 2d shown by circle R2 are illustrated in different ways, this is because the casters 1b and 2d are illustrated in different orientations. The casters 1b and 2d have the same structure and are capable of changing orientations thereof. Accordingly, in the following description, they will not be distinguished from each other, and new reference signs are used to denote the caster and the bottom surface.

FIG. 2 illustrates a caster 20 attached to a bottom surface 11 of a base 10.

The caster 20 includes a wheel 21 that rolls on a floor surface 30 during movement of the caster 20 and a support shaft 22 that supports the wheel 21. The wheel 21 includes a rotation shaft 211 that is fixed to the support shaft 22, and is rotatable around the rotation shaft 211, that is, around a rotational center line L1 that extends in a direction perpendicular to the plane of FIG. 2. The support shaft 22 is attached to the bottom surface 11 of the base 10 by a metal fitting 221 at a position above an upper end 21a of the wheel 21 such that the support shaft 22 is rotatable around a rotational center line L2 that extends in the vertical direction. In the present exemplary embodiment, the rotational center line L2 of the support shaft 22 and the rotational center line L1 of the wheel 21 do not intersect and are at positions shifted from each other. Therefore, the caster 20 receives force from the floor surface 30 during the movement and rotates so that, as illustrated in FIG. 2, the wheel 21 is behind the support shaft 22 in the moving direction shown by arrow X.

The base 10 has a frame 12 that projects downward from the bottom surface 11. In the moving direction, the frame 12 is positioned behind the support shaft 22, and also behind the rotational center line L1 of the wheel 21 during the movement. In addition, the frame 12 is positioned above the upper end 21a of the wheel 21 and extends over the entire width (dimension in the direction perpendicular to the plane of FIG. 2) of the wheel 21. The frame 12 has a function of coming into contact with the caster 20 when the support shaft 22 is bent rearward. The frame 12 is positioned above the upper end of the wheel 21 to avoid contact with uneven portions of the floor surface 30.

When a forklift is used for transportation, a height h from the floor surface to the frame 12 may be 60 mm or more to ensure sufficient space for receiving the forks of the forklift.

As described above, the caster 20 corresponds to an example of a moving tool according to the present disclosure. However, it is not always necessary that the moving tool according to the present disclosure change the orientation thereof in accordance with the moving direction as the caster 20 does. The wheel 21 and the support shaft 22 of the caster 20 respectively correspond to an example of a wheel and an example of a support unit according to the present disclosure. In addition, a contact portion 121 of the frame 12 with which the wheel 21 comes into contact corresponds to an example of a contact portion according to the present disclosure. In general, a caster that does not change the orientation thereof is structured such that a support unit of the wheel and a position at which the support unit is fixed to the base are vertically aligned with the rotation center of the wheel.

Figure 3:
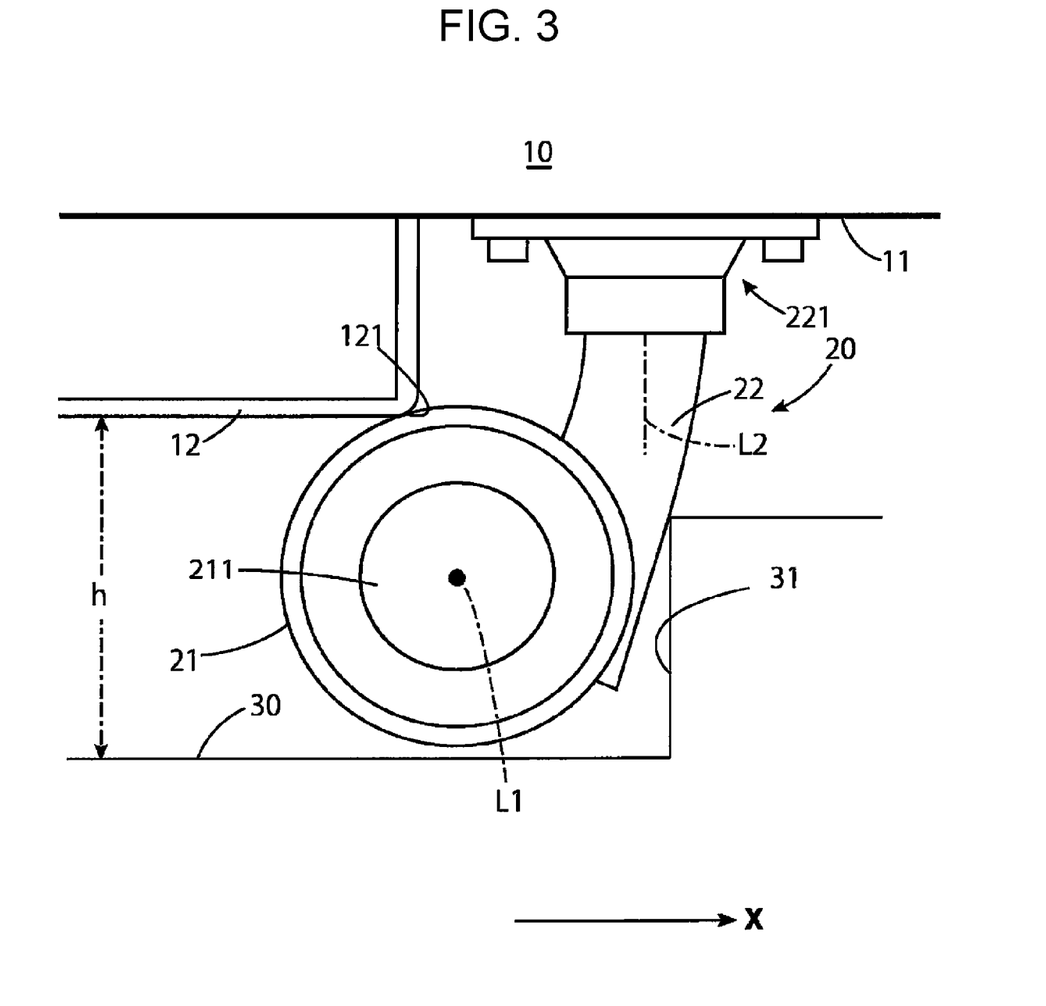
FIG. 3 illustrates the manner in which a caster hits a step on a floor surface.

FIG. 3 illustrates the manner in which the caster hits a step on the floor surface.

The caster 20 is positioned such that the support shaft 22 is in front of the wheel 21 in the moving direction shown by arrow X, and therefore the support shaft 22 hits the step 31 on the floor surface 30.

When the apparatus is a heavy object, such as the multifunction machine 1 illustrated in FIG. 1A, or when a heavy object to be carried is placed on the cart 2 as illustrated in FIG. 1B, if the support shaft 22 strongly hits the step 31, the support shaft 22 is pushed rearward and deformed so that the wheel 21 comes into contact with the frame 12. Although the wheel 21 is in contact with the frame 12 in the illustrated example, the object that comes into contact with the frame 12 is not limited to the wheel 21. As in a second exemplary embodiment described below, a caster may have a curved cover that is provided above the wheel 21 and curved along the wheel 21. In such a case, the cover may come into contact with the frame 12. However, in the following description, it is assumed that the wheel 21 comes into contact with the frame 12.

In the present exemplary embodiment, the dimensions and locations of the frame 12 and other components are set so that the wheel 21 comes into contact with the frame 12 while the support shaft 22 is within an elastic deformation range. More specifically, in the moving direction, the contact portion 121 of the frame 12 is positioned behind the midpoint in the moving direction (position shown by the straight line L3) between the rotational center line L1 of the wheel 21 and the rear end 21b of the wheel 21 in the moving direction during the movement and in front of the rear end 21b of the wheel 21 in the moving direction during the movement. In other words, when the wheel 21 is divided into four quarters in the moving direction, the contact portion 121 of the frame 12 is positioned within the rearmost quarter. Therefore, substantially a quarter of the wheel 21 at the rear end comes into contact with the contact portion 121.

The support shaft 22 is fixed to the bottom surface 11 of the base 10 by the metal fitting 221 at a position above the contact portion 121 of the frame 12 with which the wheel 21 comes into contact. The support shaft 22 is attached to the base 10 such that, in the moving direction shown by arrow X, the rotational center line L2 of the support shaft 22 is positioned in front of the midpoint in the moving direction (position shown by the straight line L4) between the rotational center line L1 of the wheel 21 and the front end 21c of the wheel 21 in the moving direction during the movement. In addition, the rotational center line L2 of the support shaft 22 is positioned behind the front end 21c of the wheel 21 in the moving direction during the movement. In other words, when the wheel 21 is divided into four quarters in the moving direction, the rotational center line L2 of the support shaft 22 is positioned within the foremost quarter. Therefore, the wheel 21 is moved upward by a large amount in response to deformation of the support shaft, and comes into contact with the frame 12 even when the frame 12 is at a high position.

In the present exemplary embodiment, when the wheel 21 is divided into four quarters in the moving direction, the rotational center line L2 of the support shaft is positioned within the foremost quarter, and the contact portion 121 of the frame 12 is positioned within the rearmost quarter. The reason for this will now be described.

Figure 4A:
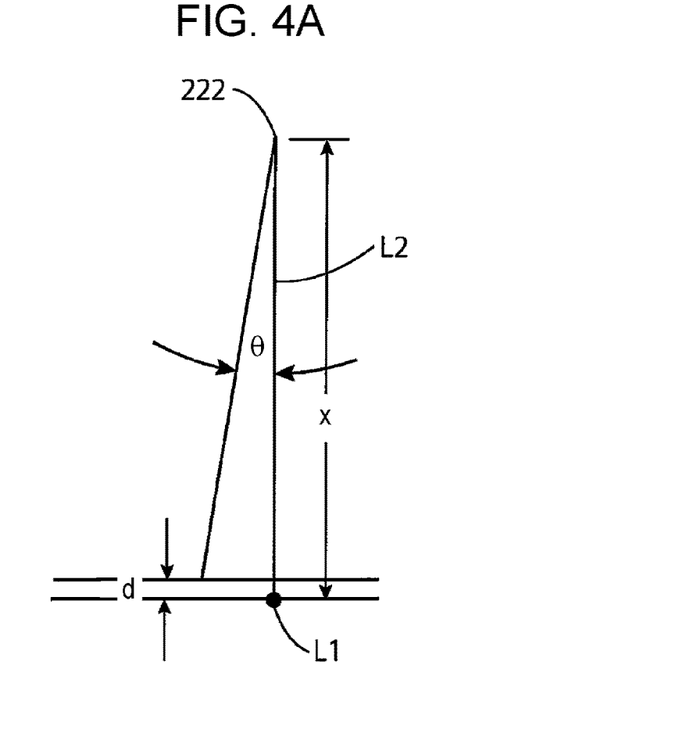
FIGS. 4A and 4B are diagrams used to describe an upward displacement of a wheel caused by a deformation of a support shaft when the support shaft and the wheel are at positions shifted from each other in a moving direction.
Figure 4B:
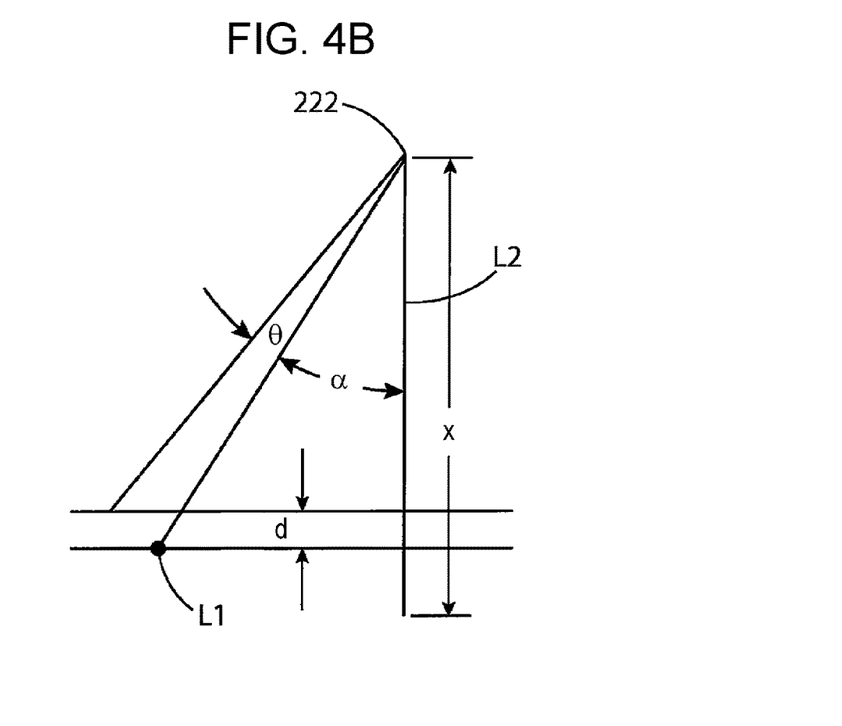

FIGS. 4A and 4B are diagrams used to describe an upward displacement of the wheel caused by deformation of the support shaft when the support shaft and the wheel are at positions shifted from each other in the moving direction.

FIG. 4A illustrates a case in which the rotational center line L1 of the wheel 21 is positioned to intersect the rotational center line L2 of the support shaft 22. Assume that the support shaft 22 is deformed around a center point 222 (see both FIGS. 2 and 3) at which the rotational center line L2 intersects a fixed portion at the upper end of the support shaft 22.

When x is the distance between the center point 222 and the rotation center point L1 of the wheel 21 and θ is a deformation angle, an upward displacement d of the wheel 21 is expressed as follows:

$$d = x \cdot (1 - \cos \theta)$$

When, for example, θ=10°, the upward displacement d of the wheel 21 is calculated as follows:

$$d = x \cdot 0.015 \quad (1)$$

Thus, when the rotational center line L1 is positioned to intersect the rotational center line L2 of the support shaft 22, the upward displacement is as small as 0.015 times the distance x.

FIG. 4B illustrates a case in which the rotational center line L1 of the wheel 21 is at a position shifted from the rotational center line L2 of the support shaft 22 in the moving direction, similarly to the exemplary embodiment illustrated in FIG. 2. Here, α is the angle of the rotational center line L1 relative to the vertical line around the center point 222. Assume that the caster 20 in which the wheel 21 and the support shaft 22 are at positions shifted from each other as described above is deformed by an angle θ.

In this case, the upward displacement d of the wheel 21 is expressed as follows:

$$d = x \cdot (\cos \alpha - \cos(\alpha + \theta))$$

When, for example, α=30° and θ=10°, the upward displacement d of the wheel 21 is calculated as follows:

$$d = x \cdot (0.866 - 0.766) = x \cdot 0.1 \quad (2)$$

The upward displacement d calculated by Equation (2) is greater than that calculated by Equation (1). Thus, when the rotational center line L1 of the wheel 21 and the rotational center line L2 of the support shaft 22 are at positions shifted from each other in the moving direction, the upward displacement d of the wheel 21 is increased even when the deformation angle θ is constant.

This is utilized in the exemplary embodiment illustrated in FIGS. 2 and 3 to cause the wheel 21 to come into contact with the contact portion 121 while the support shaft 22 is deformed by a small amount within the elastic deformation range.

This will be further described with reference to FIG. 2 again.

A straight line L5 illustrated in FIG. 2 connects the center point 222 of deformation of the support shaft 22 and the contact portion 121 of the frame 12. A straight line L6 connects the center point 222 of deformation and a contact point 21e at which the wheel 21 comes into contact with the contact portion 121 when the support shaft 22 is deformed. As described above with reference to FIGS. 4A and 4B, the angle θ between these two straight lines L5 and L6 may satisfy the following expression:

$$\theta \leq 10°$$

When θ≤10° is satisfied, the wheel 21 comes into contact with the contact portion 121 while the deformation of the support shaft 22 is within the elastic deformation range.

When only an increase in the upward displacement d (see FIGS. 4A and 4B) of the wheel 21 in response to the deformation is considered, the angle α shown in FIG. 4B may be simply increased. As the upward displacement d relative to the constant amount of deformation θ increases, the frame 12 may be shifted further upward to increase the height h from the floor surface 30, that is, to increase the space for receiving the forks of the forklift.

However, as the angle α increases, the wheel 21 turns along a larger arc to change the orientation thereof when the moving direction is changed. More specifically, as the angle α increases, the area occupied by the wheel 21 when the moving direction is changed increases. Accordingly, in the present exemplary embodiment, when the wheel 21 is divided into four quarters in the moving direction, the rotational center line L2 of the support shaft 22 is positioned within the foremost quarter, and the contact portion 121 of the frame 12 is positioned within the rearmost quarter.

When the frame 12 and the support shaft 22 are structured to satisfy the above-described conditions, the wheel 21 may be brought into contact with the frame 12, as illustrated in FIG. 3, while the support shaft 22 is within the elastic deformation range. When the wheel 21 hits the frame 12 while the support shaft 22 is within the elastic deformation range, the support shaft 22 returns to its original shape after the caster 20 is moved away from the step 31 of the floor surface 30, and transportation may be continued.

Referring to FIGS. 1A and 1B, the multifunction machine 1 and the cart 2 respectively have plural casters 1b and plural casters 2d arranged with intervals therebetween. However, the caster that has the possibility of coming into contact with the step 31 illustrated in FIG. 3 is the caster 20 disposed at the front in the moving direction shown by arrow X. Accordingly, the frame 12 illustrated in FIGS. 2 and 3 is disposed at a portion corresponding to the caster 20 disposed at the front in the moving direction.

The multifunction machine 1 illustrated in FIG. 1A is structured such that all of the casters 20 are capable of changing the orientations thereof in accordance with the moving direction, and is capable of moving both forward and sideways. Therefore, the frame 12 is positioned to correspond to each of the casters 20 having the possibility of being positioned at the front in the moving direction, and to correspond to each of the possible moving directions in which each caster 20 may be positioned at the front.

A second exemplary embodiment of the present disclosure will now be described. In the second exemplary embodiment described below, elements that are the same as those in the above-described first exemplary embodiment are denoted by the same reference sings, and only differences from the first exemplary embodiment will be described.

Figure 5:
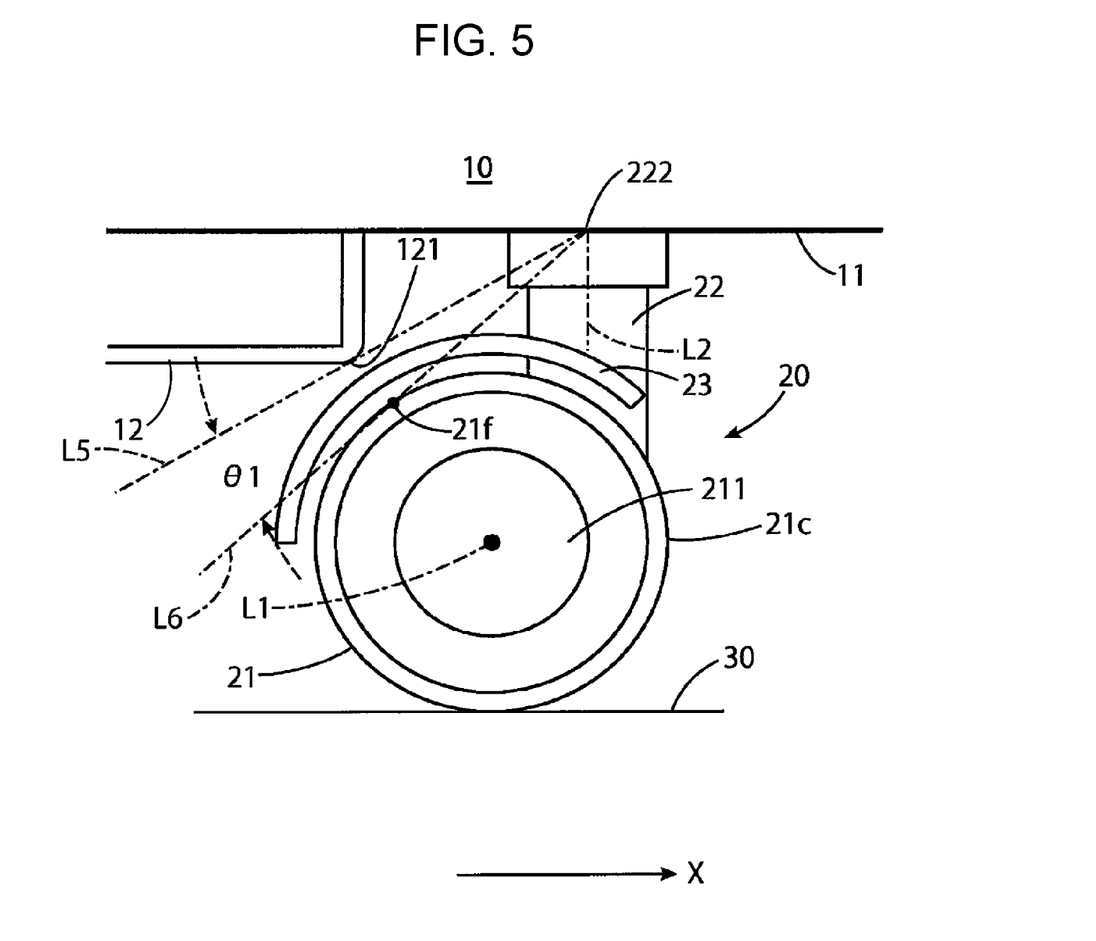
FIG. 5 is an enlarged view of a part corresponding to the part illustrated in FIG. 2 of an apparatus equipped with a moving tool according to a second exemplary embodiment of the present disclosure.

FIG. 5 is an enlarged view of a part corresponding to the part illustrated in FIG. 2 of an apparatus equipped with a moving tool according to the second exemplary embodiment of the present disclosure.

Figure 6:
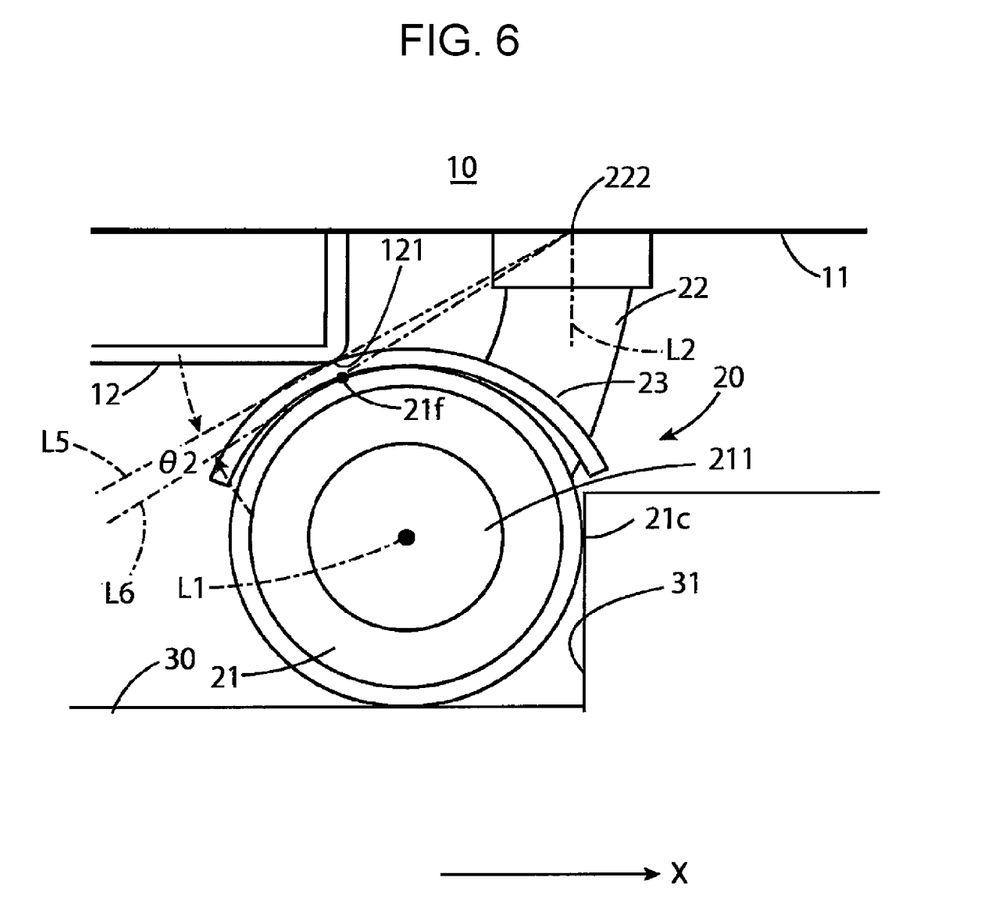
FIG. 6 illustrates the manner in which a caster of the apparatus equipped with a moving tool according to the second exemplary embodiment illustrated in FIG. 5 hits a step on a floor surface.

FIG. 6 illustrates the manner in which a caster of the apparatus equipped with a moving tool according to the second exemplary embodiment illustrated in FIG. 5 hits a step on a floor surface.

In the above-described first exemplary embodiment, the support shaft 22 projects from the wheel 21 in the moving direction. Therefore, as illustrated in FIG. 3, the support shaft 22 hits the step 31. In contrast, in the second exemplary embodiment, the front end 21c of the wheel 21 in the moving direction is in front of the support shaft 22 in the moving direction. Therefore, as illustrated in FIG. 6, the wheel 21 hits the step 31. The support shaft 22 is typically made of a metal, and the outer surface of the wheel 21 is typically made of rubber. Therefore, the wheel 21 may be configured come into contact with the step 31 to reduce damage and impact upon contact with the step 31. Also in this case, when the wheel 21 is divided into four quarters in the moving direction, the rotational center line L2 of the support shaft may be positioned in the foremost quarter.

The caster 20 according to the exemplary embodiment illustrated in FIGS. 5 and 6 includes a cover 23 disposed to surround an upper portion of the wheel 21. Therefore, as illustrated in FIG. 6, when the support shaft 22 is deformed as a result of contact with the step 31, the cover 23 comes into contact with the contact portion 121 of the frame 12. Then, the wheel 21 presses the cover 23 against the contact portion 121.

Here, the straight line L5 is similar to the straight line L5 illustrated in FIG. 2, and connects the center point 222 of deformation and the contact point 121 of the frame 12. However, the straight line L6 differs from the straight line L6 illustrated in FIG. 2, and connects the center point 222 of deformation and a pressing point 21f at which the wheel 21 presses the cover 23 against the contact portion 121 when the support shaft 22 is deformed as illustrated in FIG. 6.

Here, θ1 in FIG. 5 is an angle between the two straight lines L5 and L6 before the deformation, and θ2 in FIG. 6 is an angle between the straight lines L5 and L6 after the deformation. When the cover 23 sandwiched between and pressed against the contact portion 121 and the wheel 21 during the deformation is provided, an angle difference Δθ (=θ1−θ2) obtained by subtracting an angle corresponding to the thickness of the cover 23 may satisfy the following expression:

$$\Delta\theta \leq 10°$$

Although the multifunction machine 1 and the cart 2 are described as examples herein, the present disclosure is not limited to the multifunction machine 1 and the cart 2, and is generally applicable to apparatuses provided with casters.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An apparatus equipped with at least one moving tool, the apparatus comprising:
   a base; and
   the at least one moving tool including a wheel that rolls on a floor surface during movement of the apparatus and a support unit that is deformable and fixed to the base at a position above an upper end of the wheel and that supports the wheel,
   wherein the base includes a contact portion that is disposed at a position behind the support unit in a moving direction and above the upper end of the wheel, and the contact portion comes into contact with at least a portion of the wheel of the moving tool when the support unit is bent rearward within an elastic deformation range.

2. The apparatus according to claim 1, wherein in the moving direction, the contact portion is disposed behind a rotational center line of the wheel during the movement.

3. The apparatus according to claim 2, wherein in the moving direction, the contact portion is disposed behind a midpoint in the moving direction between the rotational center line of the wheel and a rear end of the wheel in the moving direction during the movement.

4. The apparatus according to claim 3, wherein the contact portion is disposed in front of a rear end of the wheel in the moving direction during the movement.

5. The apparatus according to claim 4, wherein the support unit is fixed to the base at a position above the contact portion.

6. The apparatus according to claim 3, wherein the support unit is fixed to the base at a position above the contact portion.

7. The apparatus according to claim 2, wherein the contact portion is disposed in front of a rear end of the wheel in the moving direction during the movement.

8. The apparatus according to claim 7, wherein the support unit is fixed to the base at a position above the contact portion.

9. The apparatus according to claim 2, wherein the support unit is fixed to the base at a position above the contact portion.

10. The apparatus according to claim 2, wherein in the moving direction, a center point in the moving direction of a region in which the support unit is fixed to the base is in front of a midpoint in the moving direction between the rotational center line of the wheel and a front end of the wheel in the moving direction during the movement.

11. The apparatus according to claim 1, wherein the contact portion is disposed in front of a rear end of the wheel in the moving direction during the movement.

12. The apparatus according to claim 11, wherein the support unit is fixed to the base at a position above the contact portion.

13. The apparatus according to claim 1, wherein the support unit is fixed to the base at a position above the contact portion.

14. The apparatus according to claim 1, wherein in the moving direction, a center point in the moving direction of a region in which the support unit is fixed to the base is in front of a midpoint in the moving direction between a rotational center line of the wheel and a front end of the wheel in the moving direction during the movement.

15. The apparatus according to claim 14, wherein the center point of the support unit is disposed behind the front end of the wheel in the moving direction during the movement.

16. The apparatus according to claim 1, wherein the contact portion is disposed at a position such that a portion of the moving tool comes into contact with the contact portion while the support unit is bent within an elastic deformation range.

17. The apparatus according to claim 1, wherein the contact portion is disposed at a position such that an angle between a first line and a second line is 10 degrees or less, the first line connecting the contact portion and a center point of deformation of the support unit in the moving direction when the support unit is bent rearward, the center point being provided on a fixed portion of the support unit that is fixed to the base, and the second line connecting the center point and a portion of the wheel that comes into contact with the contact portion.

18. The apparatus according to claim 1, wherein the moving tool further includes a cover disposed between the wheel and the contact portion, and wherein the contact portion is disposed at a position such that an angle difference obtained by subtracting a second angle from a first angle is 10 degrees or less, the first angle being an angle between a first line and a second line before deformation of the support unit, the first line connecting the contact portion and a center point of deformation of the support unit in the moving direction when the support unit is bent rearward, the center point being provided on a fixed portion of the support unit that is fixed to the base, the second line connecting the center point and a portion of the wheel that comes into contact with the contact portion with the cover disposed therebetween, and the second angle being an angle between the first line and the second line when the support unit is bent rearward and when the cover is disposed between the contact portion and the wheel and in contact with both the contact portion and the wheel.

19. The apparatus according to claim 1, wherein the at least one moving tool includes a plurality of moving tools arranged with intervals therebetween, and the contact portion is positioned to correspond to at least one of the plurality of moving tools that is disposed in a front region in the moving direction.

20. The apparatus according to claim 19, wherein at least one of the plurality of moving tools is a front moving tool that is disposed in the front region in the moving direction for movement in two directions that cross each other, and the contact portion is positioned to correspond to the movement in both of the two directions of the front moving tool.

* * * * *